(12) United States Patent
Rodriguez et al.

(10) Patent No.: US 9,215,396 B2
(45) Date of Patent: *Dec. 15, 2015

(54) FASTER ACCESS TO TELEVISION CHANNELS

(71) Applicant: Cisco Technology, Inc., San Jose, CA (US)

(72) Inventors: Arturo A. Rodriguez, Norcross, GA (US); Thomas Kernen, Bellevue (CH); Jeffrey Hopper, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 14/176,255

(22) Filed: Feb. 10, 2014

(65) Prior Publication Data

US 2014/0157311 A1    Jun. 5, 2014

Related U.S. Application Data

(63) Continuation of application No. 12/277,584, filed on Nov. 25, 2008, now Pat. No. 8,683,515.

(51) Int. Cl.
*H04N 5/445* (2011.01)
*H04N 5/50* (2006.01)
*H04N 21/438* (2011.01)
*H04N 21/2343* (2011.01)
*H04N 21/44* (2011.01)
*H04N 21/6371* (2011.01)
*H04N 21/647* (2011.01)

(52) U.S. Cl.
CPC ............. *H04N 5/50* (2013.01); *H04N 21/2343* (2013.01); *H04N 21/4384* (2013.01); *H04N 21/44004* (2013.01); *H04N 21/44016* (2013.01); *H04N 21/6371* (2013.01); *H04N 21/64784* (2013.01)

(58) Field of Classification Search
CPC .......... H04N 21/2343; H04N 21/4384; H04N 21/44004; H04N 21/44016; H04N 21/6371; H04N 21/64784; H04N 5/50
See application file for complete search history.

(56) References Cited

U.S. PATENT DOCUMENTS

| | | |
|---|---|---|
| 2002/0012394 A1 | 1/2002 | Hatano et al. |
| 2004/0067043 A1 | 4/2004 | Duruoz et al. |
| 2007/0061849 A1 | 3/2007 | Walker et al. |

(Continued)

OTHER PUBLICATIONS

"Unicast" from Wikipedia, http://en.wikipedia.org/wiki/Unicast, downloaded Aug. 5, 2013, 3 pages.

(Continued)

*Primary Examiner* — Rong Le
(74) *Attorney, Agent, or Firm* — Parker Ibrahim & Berg LLC; James M. Behmke; Stephen D. LeBarron (57) ABSTRACT

In one embodiment, a receiver for an accelerated channel change is provided. The receiver receives a first version of a video stream for a first channel and causes display of video for the first version of the video stream for the channel. A second version of a video stream is received upon a channel change to a second channel, the second version including non-discardable pictures from the first version of the video stream. The receiver displays video for the second version of the video stream for the second channel. When a transition point is reached in the first version of the video stream for the second channel, a first version of a video stream for the second channel can be displayed.

20 Claims, 4 Drawing Sheets

$$I_1B_2B_3P_4\ B_5B_6B_7B_8B_9P_{10}B_{11}B_{12}I_{13} \sim 302$$

$$I_1P_4B_7P_{10}I_{13} \sim 304$$

(56) References Cited

U.S. PATENT DOCUMENTS

2007/0160038 A1 7/2007 Liu et al.
2008/0137728 A1 6/2008 Van Der Stok et al.
2010/0132007 A1 5/2010 Rodriguez et al.
2010/0183233 A1 7/2010 Kondo et al.

OTHER PUBLICATIONS

"Multicast" from Wikipedia, http://en.wikipedia.org/wiki/Multicast, downloaded Aug. 5, 2013, 5 pages.

$$I_1B_2B_3P_4\ B_5B_6B_7B_8B_9P_{10}B_{11}B_{12}I_{13} \sim 302$$

$$I_1P_4B_7P_{10}I_{13} \sim 304$$

FASTER ACCESS TO TELEVISION CHANNELS

CROSS-REFERENCE TO RELATED APPLICATIONS

This application is a continuation application of and claims priority to U.S. application Ser. No. 12/277,584, filed on Nov. 25, 2008, the contents of which are incorporated herein by reference.

TECHNICAL FIELD

Particular embodiments generally relate to video compression.

BACKGROUND

When providing television or video programs, to a user, bandwidth constraints do not allow for the current programs corresponding to all the television channels in a full channel lineup to be provided to a set-top box at once. Thus, only a single video program or channel, or a subset corresponding to a limited number of them, is provided or transmitted to a set-top box at one time. For example, a video program that a viewer is currently tuned to and watching may be one from a subset of video programs or the only video program provided to the set-top box while the program is being watched. When a channel change occurs, a video program that was not being provided immediately prior to the channel change event, or a different video program, may be provided to a set-top box. For example, when a user changes to a new channel (i.e., from a first channel to a second channel), a network processing device (e.g., a router or a switch) needs to switch from transmitting a first video program for the first channel to transmitting a second video program for the second channel. The new video program is transmitted from the network processing device to the set-top box in a transport stream carrying a set of multiplexed streams corresponding to the new video program that includes an audio stream and a video stream. When a new video stream is received, relevant parameters need to be received first and reference pictures must be received prior to the pictures referencing the reference pictures. If the set-top box starts receiving pictures in the video stream after the parameters and/or required reference pictures were transmitted, it cannot decode the received pictures and thus would have to wait until the next transmission instance of parameters and reference pictures. The set-top box cannot properly construct a visual picture during that time. This delays the presentation of the new video program after the channel change event and viewers experience an undesirable wait for the video presentation of the new channel.

DESCRIPTION OF EXAMPLE EMBODIMENTS

Overview

In one embodiment, a receiver for an accelerated channel change is provided. The receiver receives a first version of a video stream for a first channel and causes display of video for the first version of the video stream for the channel. A second version of a video stream is received upon a channel change to a second channel, the second version including non-discardable pictures from the first version of the video stream. The receiver displays video for the second version of the video stream for the second channel. When a transition point is reached in the first version of the video stream for the second channel, a first version of a video stream for the second channel can be displayed.

In anticipation of a channel change request, a second version of a video stream corresponding to the video program of the requested channel is produced from a first version of the video stream. In one embodiment, the second version is produced continuously in real-time from the first version by continuous real-time processing. The method stores at least one successive portion of the second version of the video stream. The method comprises receiving a channel change request, which herein is also referred to as a channel change event, or channel request event, and responsive to receiving the channel change event providing the second version of the video stream. To produce the second version, the method then determines which pictures in the video stream are considered non-discardable pictures, or pictures desired to be retained, and which pictures are discardable pictures. Discardable pictures and non-discardable pictures may be determined by using picture discardability information or auxiliary information received with the first version of the video stream. For example, the picture discardability information may be provided external to the video stream, in a portion of the transport stream, and/or in an unscrambled data field. Alternatively, non-discardable pictures, or pictures desired to be retained, and discardable pictures may be determined by processing the first version of the video stream. The second version of the video stream is produced from non-discardable pictures or pictures desired to be retained. The second version of the video stream corresponding to the video program of a requested channel or a second channel may then be transmitted to a set-top box in response to a channel change event requesting the second channel. By sending the second version of the video stream, a faster channel change time may be provided because transmission of the second version of the video stream to the set-top box begins with the relevant parameters required to decode the video stream, followed by decodable pictures, and because it is expected that the second version may be processed for display faster than if the regular video stream (i.e., first version of the video stream) was provided.

Example Embodiments

Figure 1:
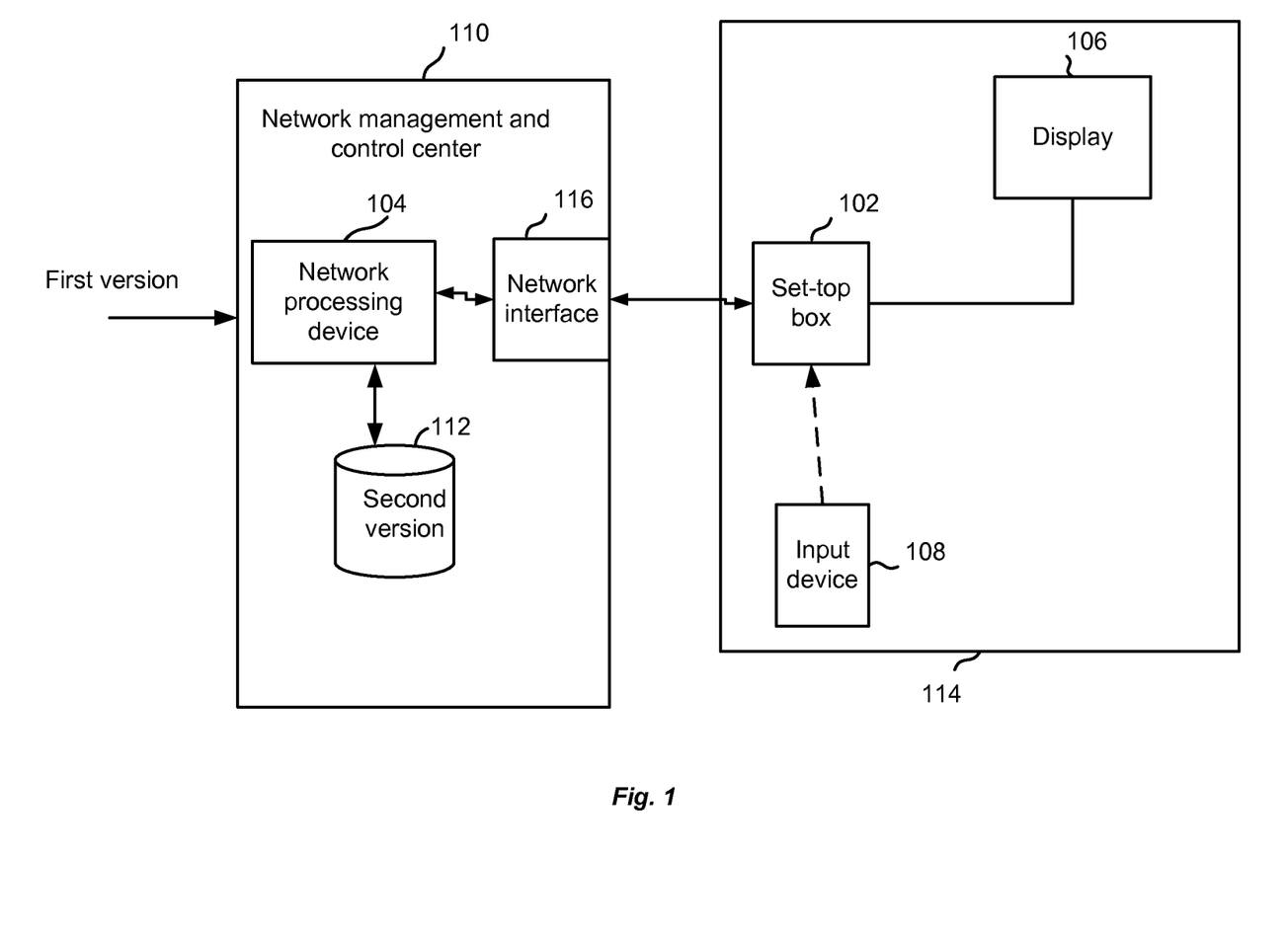
FIG. 1 depicts an example of a system for accelerating channel change time.

FIG. 1 depicts an example of a system for accelerating channel change time. In one embodiment, the system includes a set-top box 102, a network processing device 104, a display device 106, and a network management and control center (NMCC) 110. Network processing device 104 may be found in NMCC 110. Also, set-top box 102 and display device 106 may be found in a location 114, which may be a residence, office, or any other premise located remotely from NMCC 110. It should be noted that a person skilled in the art may appreciate other devices that may be included in the system, but are not shown.

Set-top box 102 may be any computing device or module that can receive video content from network processing device 104, decode it, and display it on display device 106. For example, set-top box 102 may be a device that connects to a television and causes the video content to be displayed on the screen of the television. Set-top box 102 may include or be included in or take the form of: a digital video recorder (DVR), personal computer, media gateway, video gaming console, handheld device, etc.

Display device 106 may be any device capable of displaying content, such as a television, liquid crystal display (LCD), computer monitor, handheld device, etc. Display device 106 may connect to set-top box 104 and is configured to receive uncompressed video for display. Although set-top box is shown as being separate from display device 106, it will be understood that functions of it could be integrated with display device 106. For example, display device 106 may include a network interface that may perform decoding and displaying of the video.

Network processing device 104 is configured to send a video program to set-top box 102. Although video is discussed, it will be understood that audio may be also be sent. It will be assumed that audio can be provided in a similar way as video is described. In one embodiment, network processing device 104 may include a video acceleration module configured to process the video program and provide it to set-top box 102. When sent or transmitted is used, what is sent may be provided. In one embodiment, the video program may be multiplexed as a moving pictures experts group (MPEG)-2 transport stream that carries the data and media streams corresponding to the video program. The MPEG-2 transport stream may carry the corresponding video stream of the video program encoded in accordance with the ITU H.264 video coding specification (a.k.a. ISO/IEC MPEG-4 Part 10 or AVC). The video stream may be transmitted to set-top box 102, which may decode the video. Set-top box 102 then causes display of the video on display device 106. A user (i.e., a viewer) may use input device 108 to control set-top box 12, such as when the viewer initiates a channel change request. When user, viewer, or subscriber is used, it will be understood that these terms may be used interchangeably. The channel change request may be an initial request for a channel change.

A plurality of channels or video services may be provided to a network processing device 104 from one or more or more sources or broadcasters. For example, a service provider may provide via network processing device 104 a channel lineup of video programs or video services ingested from one or more sources (not shown). Each channel is associated with a service and typically provides a respective video program at a time. That is, each channel may be associated with a respective service, such as ABC or HBO, with scheduled or broadcast video programs. The video programs of video services corresponding to all or a portion of the channels in a lineup may be multicast from a national head end (not shown) to NMCC 110. NMCC 110 ingests each respective video program corresponding to a channel in the channel lineup via network interface 116. The ingested form or "version" of the video stream corresponding to each respective video program is referred to herein as the first version of that video stream, or equally to as the first version of that video program, or just the first version. NMCC 110 may be at any of several points in a service provider's network (e.g., at a neighborhood node close to a serviced group of subscribers or viewers (or set-top boxes users). For example, NMCC 110 may serve a group of subscribers in a neighborhood of homes or premises. At NMCC 110, video programs for all the channels cannot be provided at once to set-top box 102. Accordingly, the video program for one channel or the video programs respectively corresponding to a limited number or a group of channels may be provided at the same time to set-top box 102.

When a channel change or request occurs it is typically instigated by a viewer (herein, also a user). A user may use input device 108 to input or request a channel, resulting on the video program of the requested channel to be subsequently processed by set-top box 102 and presented in display 106. Upon a viewer initiating a channel request, such as when a viewer changes from a first channel to a second channel or upon user turning or powering on set-top box 102, set-top box 102 transmits information corresponding to the channel requested to NMCC 110. The transmitted information to NMCC 110, herein also referred to as "upstream" transmitted information, identifies set-top box 102 and the requested video service or channel. Thus, the upstream transmitted information is received by NMCC 110 and notifies NMCC 110 of the requested channel by set-top box 102. Network processing device 104 then provides the video program corresponding to the requested channel to set-top box 102.

In one embodiment, the upstream transmitted information may further notify NMCC 110 a request to change the video program provided to set-top box 102 from a video program corresponding to a first channel to a video program corresponding a second channel.

In one embodiment, the upstream transmitted information includes the Media Access Control (MAC) address of set-top box 102 to identify it. In an alternate embodiment, a subscriber account number is also included. In yet an alternate embodiment, an Internet Protocol (IP) address is also included. The upstream transmitted information may include one or more of the following to identify the requested video service or channel: a corresponding video service identification or number, a corresponding channel identification or number, or an identification of a corresponding video program.

Figure 2:
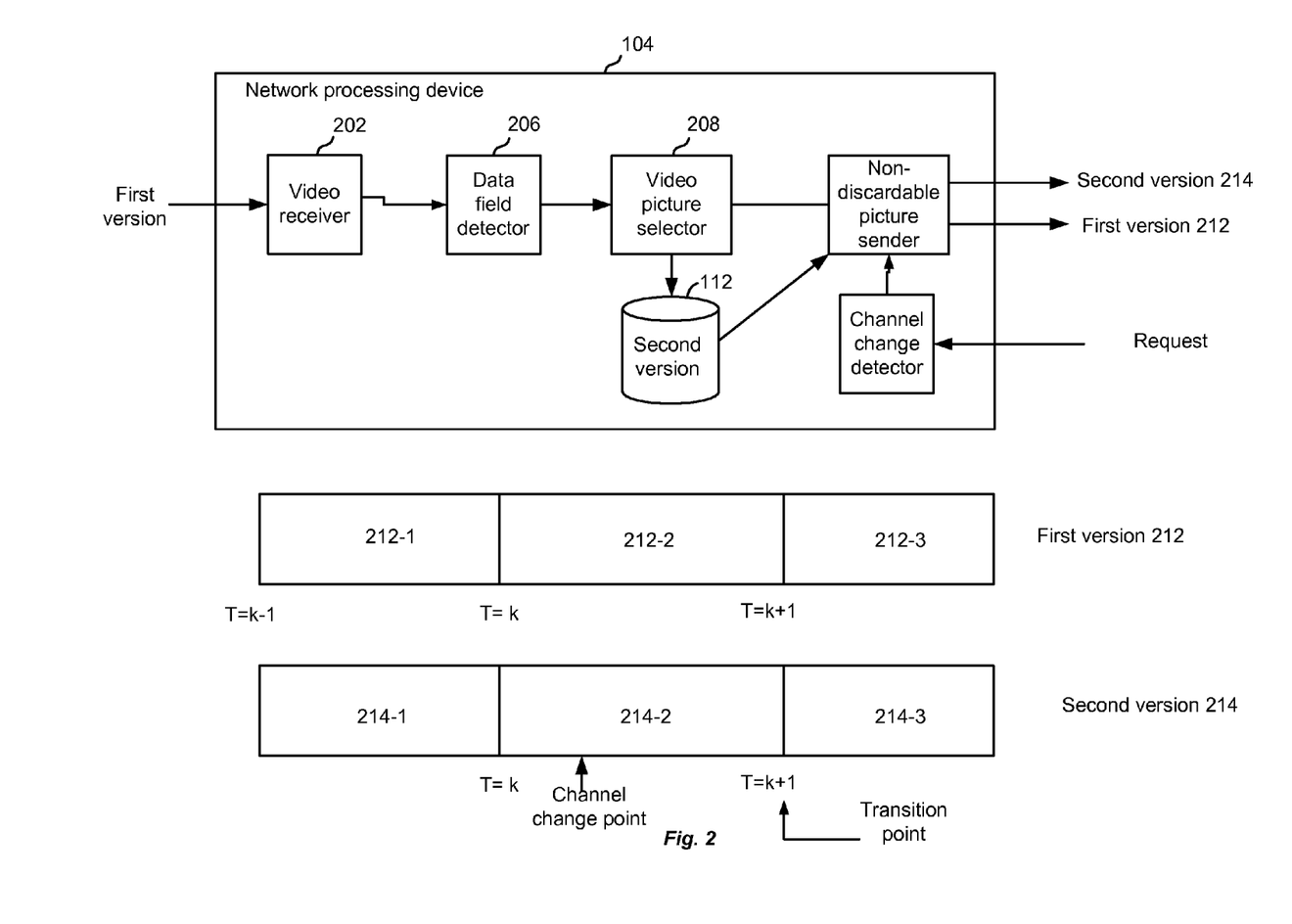
FIG. 2 depicts a more detailed example of a network processing device.

Particular embodiments provide an accelerated channel change time. A first version 212 of the video stream of a video program corresponds to the video stream received with the video program at network processing device 104. Referring to FIG. 2, which depicts a more detailed example of network processing device 104, in anticipation of a channel change, a second version 214 of the video stream of the video stream is stored in storage 112. Herein, the second version of the video program may be referred to the second version of the video stream or the second version. Second version 214 is a subset of the first version 212 or subsets of respectively corresponding portions of first version 212. Second version 214 includes or retains non-discardable pictures and/or pictures from first version 212 that are desired to be retained in the video stream. The subset of the pictures from first version 212 to be retained in second version 214 is determined by network processing device 104. The pictures considered discardable in the video stream, or a portion of the video stream, are then discarded by network processing device 104. The second version 214 of the video stream is thus a modified version of the first version 212.

For each successive portion of consecutive compressed pictures in the first version 212 of the video stream, the second version 214 contains a corresponding respective successive portion of the video stream, wherein each successive portion of second version 214 is a subset of one or more of the compressed pictures of the respectively corresponding portion of consecutive compressed pictures in first version 212. Each successive portion of the first version 212 and its respectively corresponding portion of second version 214 have a common starting point in the video stream. A starting point of the video stream corresponds to a location that is immediately prior or at a location in the video stream that contains the required parameters to decode the pictures from that point on in the video stream. The required parameters may correspond to any combination of the following for the respective successive portion of the video stream: (1) sequence parameters (e.g., a sequence parameter set), (2) picture parameters (e.g., picture parameter sets), (3) parameters that assist in the decoding, processing or outputting of pictures (e.g., visual usability information), or (4) parameters that serve as supplemental enhancement information to the video stream. Immediately following the required parameters in a successive portion of the second version 214 of the video stream is one or more compressed reference pictures. Successive portions of the video streams are stored in storage 112.

In one embodiment, as the first version of the video stream corresponding to a channel is being received by video receiver 202 in a sequential progressive manner, picture discardability information is also received in a sequential progressive manner. The picture discardability information corresponds to the compressed pictures in transmission order of the first version of the video stream. In one embodiment, the picture discardability information identifies whether a compressed picture is discardable such as with the value of a data field corresponding to the compressed picture. In an alternate embodiment, the picture discardability information identifies which compressed picture in a consecutive set of compressed picture is discardable such as with a bitmap. The picture discardability information is processed by data field detector 206 to determine and/or identify which compressed pictures in the first version of the video stream are discardable. Alternatively, data field detector 206 determines and/or identifies which compressed pictures in the first version of the video stream are non-discardable or desired to be retained. Video picture selector 208 produces in a sequential progressive manner successive portions of the second version of the video stream. Each successive portion of the second version corresponds to a respective successive portion of the first version of the video stream. Video picture selector 208 processes the first version and produces the second version of the video stream in a successive progressive manner by selecting the determined and/or identified non-discardable pictures or pictures desired to be retained in each corresponding successive portion of the first version of the video stream.

In an alternate embodiment, picture discardability information may not be received and data field detector 206 processes the first version of the video stream to determine and/or identify which compressed pictures in the first version of the video stream are non-discardable or desired to be retained. That is, data field detector 206 may parse sufficiently but not decompress the first version of the video stream to make the determination and/or identification of non-discardable pictures or pictures desired to be retained.

The successive portions of the second version of the video stream are stored in a sequential progressive manner in storage 112. In one embodiment, a predetermined number of successive portions of the second version of the video stream are stored in storage 112. Upon completion of storing a portion of the second version of the video stream, network processing device 104 causes the next portion of the second version to be written over the oldest portion of the second version of the video stream stored in storage 112. Thus, successive portions of the second version are stored in a circular buffer.

Data field selector 206 may process several first-version video streams simultaneously and video picture selector may produce their corresponding second versions. The second versions of the video streams for a plurality of channels in the channel lineup are stored simultaneously, consistently in real-time through the progression of time, in storage 112. In an alternate embodiment, the second versions of the video streams corresponding to each channel in the channel lineup are stored simultaneously, consistently in real-time through the progression of time, in storage 112.

Portions of the second version of the video stream, P1, P2, P3 and P4 are in successive order in the video stream. In one embodiment, capacity in storage device is assigned to store three successive portions of the second version of the video stream. At any point in time, two complete successive portions of the second version of the video program, P2 and P3, respectively, are available to be provided upon a channel change request while portion P4 is being stored in storage 112 over an earlier stored portion, P1. That is, the storage of each second version of a video stream is implemented in a circular buffer.

In an alternate embodiment, at any point in time, N−1 complete successive portions of the second version of the video program are available to be provided upon a channel change request while the Nth successive portion is stored in storage 112 over the first of the N successive portions.

In one embodiment, the number of successive portions of the second version of a first channel's video stream buffered in storage 112 is different from the number of successive portions buffered for the second version of a second channel's video stream. Although N differs for the two channels or video programs, they may have the same or approximately the same time span. The number of successive portions to buffer, N, for each respective channel is determined by the picture rate of the channel's first-version video stream to maintain a desired time span during the first phase of providing a video program in response to a channel change. For instance, a first channel or first video program may have a rate of 60 pictures per seconds while a second channel or second video program may have a rate of 30 pictures per seconds. Hence, the number of successive portions buffered in storage 112, N, is determined by a desired time span for which to effect the first phase of a channel change, and, thus, may differ for each respective channel or video program according to the picture rate of the corresponding first-version video stream. The picture rate of a first-version video stream is determined by data field selector 206

In an alternate embodiment, the number of successive portions of a video stream, N, to buffer in storage 112 for a channel or video program is determined by video picture selector 208 from the number of pictures in the successive portions of the second version of the video stream. Hence, the number of successive portions of the second version of a first channel's video stream buffered in storage 112 may different from the number of successive portions buffered for the second version of a second channel's video stream in order to maintain the same or a minimum number of pictures through the first phase of providing a video program in response to a channel change.

In yet another embodiment, the number of successive portions of a video stream, N, to buffer in storage 112 for a channel or video program is determined from both: (1) a minimum number of pictures in the successive portions of the second version of the video stream, and (2) by a minimum time span for the first phase of providing a video program in response to a channel change.

The number of buffered successive portions of the second version of a video stream in storage 112, N, may change dynamically through the progression of time according to the number of non-discardable pictures or pictures desired to be retained, as determined by video picture selector 208.

When a channel change request occurs, second version 214 is transmitted to set-top box 102 for a pre-determined amount of time or number of pictures to effect a faster channel change time. For example, from a time before the channel change, N−1 successive portions of second version 214 may have previously been stored in storage 112, and second version 214 is retrieved by network processing device 104 and transmitted to set-top box 102. Second version 214 is transmitted to allow a faster channel change time. The first picture cannot be displayed until a full reconstructed picture is received. When set-top box 102 received second version 214 of the video stream, it receives the start of a successive portion which starts immediately prior to or at the location in the video stream that contains the parameters required to decompress the video stream from that point on. Immediately after the parameters, second version 214 contains at least one or more reference pictures. The set-top box 102 can then display a picture quicker than if first version 212 is received because second version 214 includes and starts with the video sequence parameters and non-discardable pictures or pictures desired to be retained, and, thus, set-top box 102 does not have to wait for the next instance of information that are needed to decode and display the pictures and reference frames. If first version of the video stream 212 is transmitted, set-top box 102 may have to wait longer until the parameters or reference frames occur in the video stream. The full picture can be displayed after the second successive portion is received from the second version and the first version may be decoded and the picture fully reconstructed.

Because pictures for the video stream are stored from before a time the channel change is received, second version 214 may be transmitted to allow the picture for the new channel to be displayed immediately. The user would see a picture for the new channel displayed although the picture may have been from a previous transmitted time. However, because the user was not watching the channel before the change, the user cannot tell it is from a previous time. But, a picture is displayed faster for the new channel. And because discardable pictures are not included in the second version, the set-top box 102 decodes and displays the pictures in the second version of the video stream in a faster progression than its normal playback more or intended picture output rate.

A transition point from a first phase to a second phase of "providing a video program upon a channel change request" is reached after the N−1 successive portions of the second version of the video stream are transmitted to set-top box 102. Immediately, after the end of the last successive portion of the second version, the first version 212 of the video stream is inserted by network processing device 104, starting with the corresponding portion of the first version of the video stream that succeeds the last successive portion of the second portion. Then, the regular video stream (i.e., the first version) is transmitted from then on.

Since there are several set-top boxes receiving video programs from network management and control center 110, when the insertion from the second version to the first version of the video stream transpires, network processing device 104 continues to store the successive portions of the second version of the video stream in anticipation of a channel change request from another set-top box (not shown but equal or similar to set-top box 102) or for a future channel change request from the same set-top box 102.

The discardable pictures may be identified using a picture discardability information field. For example, the adaptation field (AF) extension defined in the MPEG-2 transport stream may be used to identify which pictures are discardable or desired to be retained. In one embodiment, the picture discardability information (or pictures desired to be retained) data field is not included in the video stream that is carrying the video. For example, picture discardability information is external to the payload of the packets carrying the video. Thus, the video stream does not need to be inspected to determine which pictures may be considered discardable or desired to be retained. This may be useful because the payload of transport packets, where the video stream is carried, may be scrambled or encrypted and thus network processing device 104 would otherwise have to unscramble the payload and/or decode the picture to determine if the picture is discardable or not.

Second version 214 of the video stream is transmitted to set-top box 102, e.g., a portion of the second version of the video stream corresponding to the requested channel is transmitted. The non-discardable pictures may be pictures that are deemed important in constructing the picture and should be retained. For example, the non-discardable pictures may be reference pictures, such as I pictures. Also, other reference pictures may be provided, such as B pictures and other reference pictures that are depended on to construct a picture. The pictures other than I pictures may be provided because, for example, in AVC, some references pictures may not just include I pictures or instantaneous decoding refresh (IDR) pictures. For example, B pictures can be used as reference pictures in AVC. Accordingly, the picture discardability information data field allows identification of non-discardable pictures that are not just I pictures or IDR pictures. In addition to sending the non-discardable pictures, video sequence parameters may be provided. The video sequence parameters are the parameters needed by set-top box 102 to be able to display the picture. An example of the parameters includes resolution of the picture. By sending non-discardable pictures, it is expected that set-top box 102 can construct a picture faster than if the full video stream is transmitted (i.e., a video stream with non-discardable and discardable pictures) because the video decoder in set-top box 102 is relieved from decoding excluded pictures (e.g., discardable pictures) from the first version of the video stream and because video sequence parameters and non-discardable pictures from the immediately past portion of the video stream are provided faster to set-top box 102. Other types of pictures that may be considered non-discardable will be discussed in more detail below.

FIG. 2 depicts a more detailed example of network processing device 104. Video receiver 202 is configured to receive video programs. For example, video may be received from a service provider. All the channels in the lineup may be received at once. When a user is watching a channel, the video program is transmitted to set-top box 102. This includes the first version of the video stream and is represented by video stream 212. Although sending first video stream 212 or second video stream 214 is discussed, it will be understood that other parts of the video program may be transmitted, such as audio and close captioning information. At some point, a channel change is detected by set-top box 102, which then notifies network management and control center 110 of the channel change.

The following process of determining discardable pictures may be performed continuously or only when a channel change is detected. For example, as video streams for the lineup of channels are received from the network, a cached second version 214 of the video stream may be stored for all channels in storage 112. Thus, when a channel change occurs, second version 214 of the video stream may be transmitted to set-top box 102. Also, in another embodiment, the stream of non-discardable pictures may be determined dynamically when the channel change is detected.

In determining the non-discardable pictures, a data field detector 206 is configured to review the picture discardability information data field for the video stream. For example, for the video stream that the channel that is tuned to, a picture discardability information data field is determined in a packet. In one embodiment, the picture discardability information is in the adaptation field (AF) extension. This data field may include a bit map that identifies which pictures may be discardable. For example, the bits correspond to a previous or future set of transmitted pictures. In one embodiment, each picture's discardability property may be represented by a bit in the bit map. The corresponding bits may be ordered according to the order of the transmitted pictures. Thus, pictures in the video stream are identified by the bit's value and it may be determined which pictures are discardable or not based on the bit values in the bitmap. Also, the picture discardability information field may be included in other forms of transport, such as in a header of an IP packet.

In one embodiment, the picture discardability information data field is external to the transport stream. For example, the picture discardability information data field is outside of the video coding layer. This provides advantages because the picture discardability information may be easily determined with minimal processing. For example, the picture discardability information data field may be found in a header of a packet, which may not be scrambled. In contrast, the payload of packets including the video may be scrambled, and would have to be unscrambled if the picture discardability information is included in the payload.

A picture may be marked as being non-discardable for different reasons. The reasons may be different than from just considering the picture type corresponding to the respective pictures in the video stream. For example, the picture type for a picture may indicate which type the picture is, such as a B, P, or I picture. However, the picture type may not be sufficient to determine if a picture is discardable. For example, as mentioned above, B pictures may be used as reference pictures in AVC. Further, the type of picture in the AVC video stream cannot be determined according to an assumed group of pictures (GOP) structure or some transmission order of pictures as was conventionally possible to assume in MPEG-2 video streams. The picture type is also carried in the payload of transport packets, which may be scrambled. Thus, determining the picture type may require that a payload of transport packets be unscrambled. Accordingly, the picture discardability information data field may provide a better determination of discardability than just using the picture type.

A video picture selector 208 is configured to determine which pictures are non-discardable using the picture discardability information field. By referring to the bit map, packets are determined that include pictures that are non-discardable. For example, the data chunks in the video streams for non-discardable pictures are identified by the bit values of the bit map and by finding consecutive picture start codes in the packetized elementary stream (PES) layer. Discardable pictures may not be aligned in packets, such as the picture may be partially included in multiple packets. Thus, it may be hard to determine which payload of packets includes pictures that are discardable. If the video stream is scrambled, de-scrambling may be necessary to determine the start codes. Each discardable picture is then identified in the packets. To avoid descrambling, in another embodiment, the start of each picture is transmitted in a transport packet that always includes the adaptation field. Rather than a bit map, the adaptation field contains a data field (e.g., a single bit) signifying that the picture (or a portion of the picture) included in the packet is discardable or not. Thus, packets may be identified as including picture discardability information or not and discardable picture in the video stream can then be identified without de-scrambling.

Figure 3:
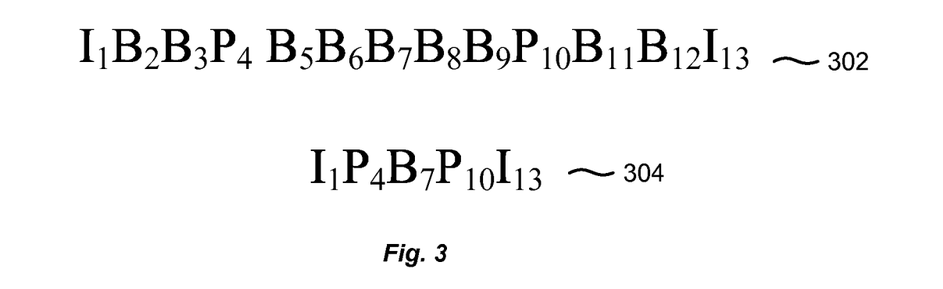
FIG. 3 shows an example of a group of pictures.

In one embodiment, video picture selector 208 continually stores second version 214 of the video stream in storage 112. For example, FIG. 3 shows a portion of first version 212 of the video stream that includes a number of groups of pictures (GOPs). First version 212 includes discardable and non-discardable pictures. At a time t=k, a channel change request is received. Each portion of the video stream will be referred to with a −1, −2, etc. Before this time, first version 212-1 had already been transmitted to set-top box 102 (it was transmitted starting at time t=k−1. Also, network processing device 104 processes first version 214-1 to generate second version 214-1 of the video stream. Second version 214-1 is stored in storage 112. The processing and storage of second version may be performed in anticipation of receiving a channel change request, i.e., prior to receiving the request or knowing about the request. Thus, second versions for each channel may be stored for the entire channel lineup. The process of sending second version 214 will be discussed below in more detail.

Also, video picture selector 208 may determine non-discardable pictures when an indication of a channel change is determined. Second version 214 is a special version of the video stream that includes only non-discardable pictures. These non-discardable pictures may not just be I pictures and/or IDR pictures. For example, FIG. 3 shows an example of a group of pictures 302 for first version 212 in display order. Their corresponding transmission order is different (not shown) according to the picture referencing inter-dependencies. As shown, I pictures, B pictures, and P pictures are provided. An example of second version 214 includes the pictures $I_1$, $P_4$, $B_7$, $P_{10}$ and $I_{13}$. It should be noted that the picture $B_7$ may be included in the non-discardable video stream 304. In one embodiment, B pictures may be considered reference pictures in the video stream. Also, if a large number of discardable pictures are received in a row, it may be desirable to include a discardable picture in the non-discardable video stream 304. In one embodiment, when any instance of discardable pictures in the video stream exceeds a threshold (e.g., 5), the middle discardable picture (i.e., the third out of the 5 or the second of 3 if the threshold is 3), is not marked as discardable to minimize a jerking motion during the initial period after changing channels.

Also, in another embodiment, certain discardable pictures are not marked as discardable because of a display property for the picture. For example, the viewing experience may take into account in marking which pictures are discardable. In one example, the type of motion in that video segment is used to determine which pictures are discardable. For example, all or selected discardable pictures are marked discardable for a stationary scene or for a very fast motion (because the human visual system's temporal response is band-limited and thus the removal of the discardable pictures for a very fast motion scene may not be detected even if some pictures were included). For smooth panning scenes, certain discardable pictures may not be marked as discardable to reduce jerkiness in the newly displayed video.

In yet another embodiment, certain non-discardable pictures may be marked discardable if they are not referenced by other reference pictures. For example, the non-discardable pictures may be only referenced by discardable pictures.

Also, in another embodiment, in addition to only retaining non-discardable pictures, the video stream provided by server 104 upon the channel change may be with a reduced picture resolution, such as half in the horizontal to make the channel change tune faster. Some pictures are not marked as discardable to retain a suitable picture rate.

Channel change detector 204 determines when a channel change should occur. For example, a channel change request is received from set-top box 102. Channel change detector 204 notifies picture sender 210. Picture sender 210 can then send second version 214 of the video stream to set-top box 102. In one example, second version 214-1 is retrieved from storage 112. If the channel change request is received sometime between t=k and t=k+1, then second version 214-1 is from before t=k in one example. Second version 214-1 may then be transmitted to set-top box 102. As second version 214-1 is being retrieved, second version 214-2 is being saved. That is, first version 212-2 was processed to remove discardable pictures to produce second version 212-2. Second version 212-2 is then saved in storage 112. In one embodiment, storage 112 may be a circular buffer where portions of the second version of the video stream are stored. As a portion is stored, one portion may be removed. Any amount of video may be stored in storage 112. In one example, one portion corresponding to a GOP may be stored, that is, non-discardable pictures for a GOP of first version 212. As a portion of second version 214 is stored, the previously stored portion is removed (and can be transmitted to set-top box 102 if a channel change request was received.)

Accordingly, first version 212 of the video stream of the prior channel is not transmitted anymore after a channel change. This allows set-top box 102 to receive a portion of second version 214 of the new channel's video stream, containing all pictures that are considered non-discardable when a channel change occurs. The non-discardable pictures allow channel change time to be accelerated because set-top box 102 can construct a new picture for the new channel quicker because the non-discardable pictures and video sequence parameters are provided faster using the second version of the video stream. For example, if the reference pictures are included as non-discardable pictures, a reference picture may be received faster and used to construct a picture. Further, other factors, such as motion of the picture, may be taken into account to include pictures that are considered non-discardable. Thus, a faster channel change is effected while making the channel change less jerky.

Once the channel change has been effected, network processing device 104 may transition back to sending first version 212 of the video stream. For example, after a pre-determined time, second version 214 of the video stream is not transmitted and first version 212 of the video stream for the new channel is transmitted. Because the picture resolution does not change or may only be horizontally reduced, the splice to first version 212 of the video stream does not need to be an IDR. This provides a smoother transition from second version 214 to the first version 212 of the video stream.

Figure 4:
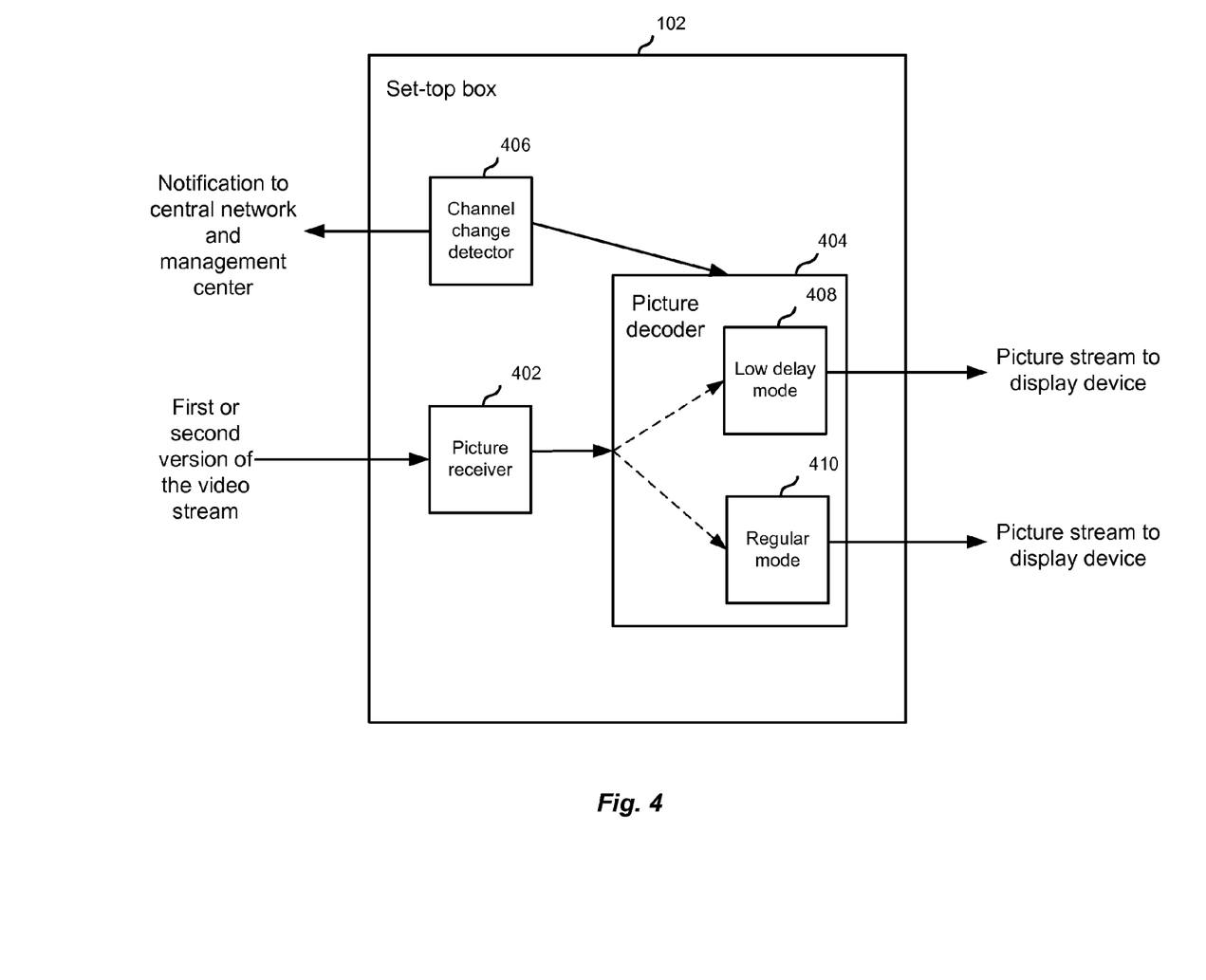
FIG. 4 depicts an example of a set-top box.

FIG. 4 depicts an example of set-top box 102. A picture receiver 402 is configured to receive a video stream. A picture decoder 404 decodes the pictures and displays them on display device 106. When a channel change is not occurring, picture decoder 404 operates in a regular mode 410, which decodes a full video stream and causes display of the video.

A channel change detector 406 is configured to detect a channel change. When this occurs, picture decoder 404 may be notified and may be caused to operate in a low delay mode. Low delay mode is a mode that allows set-top box 102 to process second version 214 without incurring an error. For example, this allows the video decoder in set-top box 102 to disregard certain policies of managing the compressed picture buffer. The buffer may have policies regarding overrun and underrun of it. If second version 214 includes only non-discardable pictures, then the policies may trigger an error during regular mode. However, using the low delay mode tells set-top box 102 to operate differently. In one embodiment, the low delay mode repeats display of the last decoded non-discardable picture until decoding the next non-discardable picture completely. Also, this allows the video decoder in set-top box 102 to disregard certain policies of managing the compressed picture buffer.

When the channel change process is finished, picture receiver 402 receives second version 214 of the video stream and forwards it to picture decoder 404. Picture decoder 404 may then transition back to regular video decoding mode 410 at the transition point.

Figure 5:
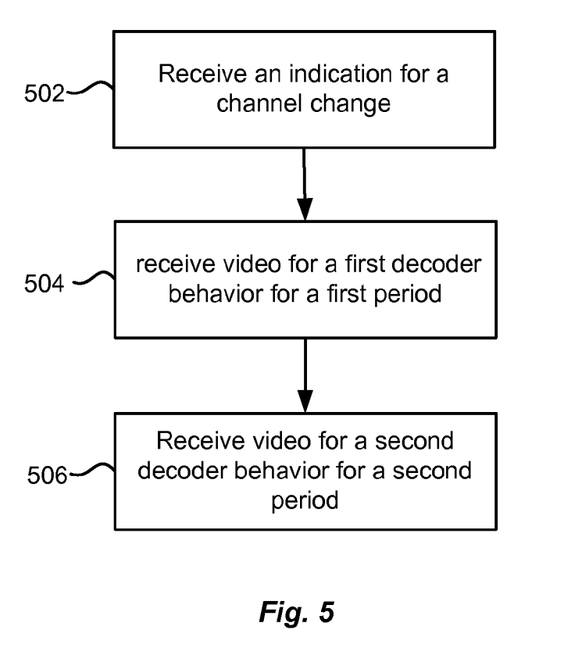
FIG. 5 depicts an example of a method for providing an accelerated channel change time.

FIG. 5 depicts an example of a method for providing an accelerated channel change time. Step 502 receives an indication for a channel change. The indication may be received from input device 108.

Step 504 then receives video for a first decoder behavior for a first period. For example, the video may include non-discardable pictures. The decoder behavior may be a low delay mode where set-top box 102 repeatedly displays the last decoded non-discardable picture until decoding the next non-discardable picture completely. This video may be received for a certain amount of time after the channel change.

Step 506 then receives video for a second decoder behavior for a second period. For example, after a period of time or certain number of pictures is received, a regular video stream may be received. Set-top box 102 then transitions from the low delay mode to a regular mode of displaying video. The second decoder behavior may be behavior that displays pictures when a channel change is not occurring or after the transition period.

In conclusion, the process to determine which pictures are non-discardable is provided using a picture discardability information data field. This allows network processing device 104 to determine the discardable pictures with minimal processing. For example, the actual video stream does not need to be processed or may be minimally processed. For example, the information that is needed to determine if a picture is discardable or not is external to the video transport stream. Thus, the video stream does not need to be unscrambled and searched for the picture discardability information.

Although the description has been described with respect to particular embodiments thereof, these particular embodiments are merely illustrative, and not restrictive. For example, although MPEG-2 is discussed, it will be understood that any protocol may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising: displaying, by a network device, a first video stream associated with a first channel using a first video processing mode, in which the network device is configured to decode a full video stream; determining, by the network device, a user input for a channel change to a second channel; in response to the channel change to a second channel, receiving, at the network device, a second version of a second video stream, wherein the second version includes a non-discardable picture that corresponds to a non-discardable picture in a respective set of consecutive non-discardable pictures in a first version of the second video stream, and the non-discardable picture is included responsive to a number of consecutive non-discardable pictures in the first version exceeding a predetermined threshold; displaying, by the network device, the second version of the second video stream in a second video processing mode, in which the network device is configured to suppress an error associated with an overrun or underrun of a buffer that stored the second version of the second video stream, wherein the error would have been generated in the first video processing mode; receiving, at the network device, a first version of the second video stream; and displaying, by the network device, the first version of the second video stream using the first video processing mode.

2. The method of claim 1, wherein the first video processing mode is a regular video processing mode and the second video processing mode is a low delay processing mode.

3. The method of claim 2, wherein the low delay processing mode comprises repeating display of a last decoded picture until a next picture is decoded.

4. The method of claim 1, wherein the second video processing mode allows a buffer that stored the second version of the second video stream to violate a policy set for the buffer in the first video processing mode.

5. The method of claim 1, wherein the second version of the second video stream allows construction of a picture faster than if the first version of the second video stream is used to construct a picture.

6. The method of claim 1, wherein each non-discardable picture is a picture that is deemed important in constructing the respective video stream.

7. The method of claim 1, wherein the non-discardable pictures allow display of the first version of the second video stream upon receiving a first picture in the second version of the second video stream.

8. A system comprising: one or more computers and one or more storage devices storing instructions that are operable, when executed by the one or more computers, to cause the one or more computers to perform operations comprising: displaying, by a network device, a first video stream associated with a first channel using a first video processing mode, in which the network device is configured to decode a full video stream; determining, by the network device, a user input for a channel change to a second channel; in response to the channel change to a second channel, receiving, at the network device, a second version of a second video stream, wherein the second version includes a non-discardable picture that corresponds to a non-discardable picture in a respective set of consecutive non-discardable pictures in a first version of the second video stream, and the non-discardable picture is included responsive to a number of consecutive non-discardable pictures in the first version exceeding a predetermined threshold; displaying, by the network device, the second version of the second video stream in a second video processing mode, in which the network device is configured to suppress an error associated with an overrun or underrun of a buffer that stored the second version of the second video stream, wherein the error would have been generated in the first video processing mode; receiving, at the network device, a first version of the second video stream; and displaying, by the network device, the first version of the second video stream using the first video processing mode.

9. The system of claim 8, wherein the first video processing mode is a regular video processing mode and the second video processing mode is a low delay processing mode.

10. The system of claim 9, wherein the low delay processing mode comprises repeating display of a last decoded picture until a next picture is decoded.

11. The system of claim 8, wherein the second video processing mode allows a buffer that stored the second version of the second video stream to violate a policy set for the buffer in the first video processing mode.

12. The system of claim 8, wherein the second version of the second video stream allows construction of a picture faster than if the first version of the second video stream is used to construct a picture.

13. The system of claim 8, wherein each non-discardable picture is a picture that is deemed important in constructing the respective video stream.

14. The system of claim 8, wherein the non-discardable pictures allow display of the first version of the second video stream upon receiving a first picture in the second version of the second video stream.

15. Non-transitory one or more computer readable storage media encoded with software comprising computer executable instructions and when the software is executed operable to perform operations comprising: displaying, by a network device, a first video stream associated with a first channel using a first video processing mode, in which the network device is configured to decode a full video stream; determining, by the network device, a user input for a channel change to a second channel; in response to the channel change to a second channel, receiving, at the network device, a second version of a second video stream, wherein the second version includes a non-discardable picture that corresponds to a non-discardable picture in a respective set of consecutive non-discardable pictures in a first version of the second video stream, and the non-discardable picture is included responsive to a number of consecutive non-discardable pictures in the first version exceeding a predetermined threshold; displaying, by the network device, the second version of the second video stream in a second video processing mode, in which the network device is configured to suppress an error associated with an overrun or underrun of a buffer that stored the second version of the second video stream, wherein the error would have been generated in the first video processing mode; receiving, at the network device, a first version of the second video stream; and displaying, by the network device, the first version of the second video stream using the first video processing mode.

16. The media of claim 15, wherein the first video processing mode is a regular video processing mode and the second video processing mode is a low delay processing mode.

17. The media of claim 15, wherein the second video processing mode allows a buffer that stored the second version of the second video stream to violate a policy set for the buffer in the first video processing mode.

18. The media of claim 15, wherein the second version of the second video stream allows construction of a picture faster than if the first version of the second video stream is used to construct a picture.

19. The media of claim 15, wherein each non-discardable picture is a picture that is deemed important in constructing the respective video stream.

20. The media of claim 15, wherein the non-discardable pictures allow display of the first version of the second video stream upon receiving a first picture in the second version of the second video stream.

* * * * *